(12) United States Patent
Berteau et al.

(10) Patent No.: US 8,196,176 B2
(45) Date of Patent: Jun. 5, 2012

(54) SYSTEM AND METHOD FOR IDENTIFYING A COOKIE AS A PRIVACY THREAT

(75) Inventors: Stefan A. Berteau, Washington, DC (US); Michael L. Grucz, Mechanicsburg, PA (US); Kevin C. Goldsmith, Plano, TX (US)

(73) Assignee: CA, Inc., Islandia, NY (US)

( * ) Notice: Subject to any disclaimer, the term of this patent is extended or adjusted under 35 U.S.C. 154(b) by 619 days.

(21) Appl. No.: 12/104,102

(22) Filed: Apr. 16, 2008

(65) Prior Publication Data

US 2008/0263627 A1     Oct. 23, 2008

Related U.S. Application Data

(60) Provisional application No. 60/912,590, filed on Apr. 18, 2007.

(51) Int. Cl.
*G06F 7/04* (2006.01)

(52) U.S. Cl. .............................. 726/1; 726/26

(58) Field of Classification Search ................ 726/1
See application file for complete search history.

(56) References Cited

U.S. PATENT DOCUMENTS

2006/0075122 A1 * 4/2006 Lindskog et al. ............ 709/228

OTHER PUBLICATIONS

Simon Byers, Lorrie Faith Cranor, and David Kormann, "Automated Analysis of P3P-Enabled Web Sites," AT&T Labs Research, 12 pages.

* cited by examiner

*Primary Examiner* — Brandon Hoffman
(74) *Attorney, Agent, or Firm* — Baker Botts L.L.P.

(57) ABSTRACT

A system and method for identifying a cookie as a privacy threat is disclosed. The system and method include receiving a request to install a cookie. A privacy policy associated with the cookie is also received, and that privacy policy may be evaluated against a set of predefined criteria. Based on this evaluation, the cookie may be determined to be a privacy threat.

36 Claims, 2 Drawing Sheets

SYSTEM AND METHOD FOR IDENTIFYING A COOKIE AS A PRIVACY THREAT

RELATED APPLICATION

This application claims the benefit of U.S. Provisional Application Ser. No. 60/912,590 filed Apr. 18, 2007, entitled Cookie Scoring System and Method, which is hereby incorporated by reference.

TECHNICAL FIELD

The present disclosure relates generally to privacy threat determinations, and more particularly to determining whether a cookie presents a privacy threat.

BACKGROUND

When a user directs a web browser to a website, the web browser may receive a request to install a cookie. A cookie may be a short text file that is associated with the domain name of the website that sets the cookie on the user's web browser. When the web browser with the stored cookie returns to the website that installed the cookie, the web server associated with that website may receive the cookie and use the information included in the text file. The information in the cookie may be used to customize a web page or for other operations that may be accomplished with information about the user or the user's browser.

Often a user may visit a website and receive a request to install a cookie from a domain name that is not the website to which the user had directed its browser. This request by a third-party to have its third-party cookie installed on the user's web browser may be unknown to the user. A third-party cookie may pose a threat to the privacy of the user by allowing a third-party to track the browsing and site interaction habits of the user in a way that is invisible to most users. The level of threat may depend on the third-party's intended use of the information it collects through its third party cookies.

SUMMARY

In accordance with a particular embodiment of the present disclosure, a method for automatically identifying a cookie as a privacy threat includes receiving a request to install a cookie. A privacy policy associated with the cookie is also received. That privacy policy may be evaluated against a set of predefined criteria. Based on this evaluation, the cookie may be determined to be a privacy threat.

Technical advantages of particular embodiments of the present disclosure may include a system that automatically determines if a cookie is a privacy threat by evaluating a privacy policy associated with the cookie. The system may allow consistent and repeatable privacy threat determinations, as opposed to a subjective evaluation of a privacy risk made by a human.

Further technical advantages of embodiments of the present disclosure may include the ability to crawl a large number of URLs in order to make many privacy threat determinations in a relatively short period of time.

Yet further technical advantages of particular embodiments of the present disclosure may include collecting domain names associated with cookies that have been determined to be a threat in a signature file. This signature file may support anti-spyware software that may notify a user that a request to receive a cookie that may be a privacy threat is being received. A user may then consider this notification and take appropriate action, including directing his web browser to block the cookie.

Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE DRAWINGS

A more complete understanding of the present embodiments and advantages thereof may be acquired by referring to the following description, taken in conjunction with accompanying drawings wherein.

DETAILED DESCRIPTION OF THE INVENTION

Figure 1:
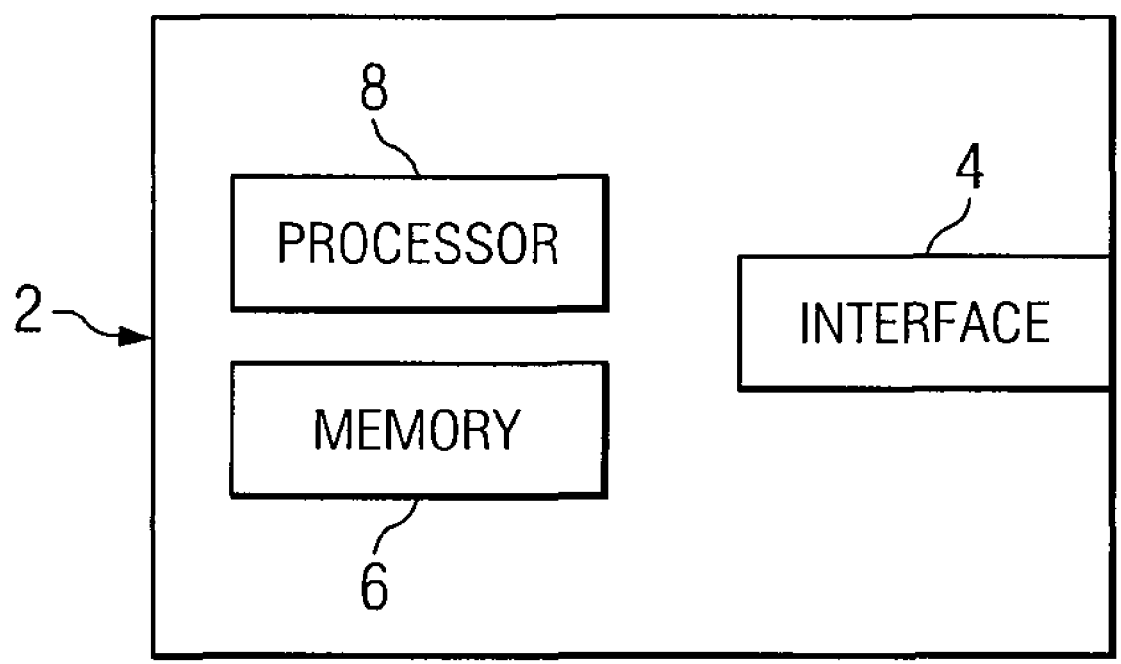
FIG. 1 is a block diagram illustrating a system for identifying a cookie as a privacy threat accordance with an embodiment of the present disclosure.
Figure 2:
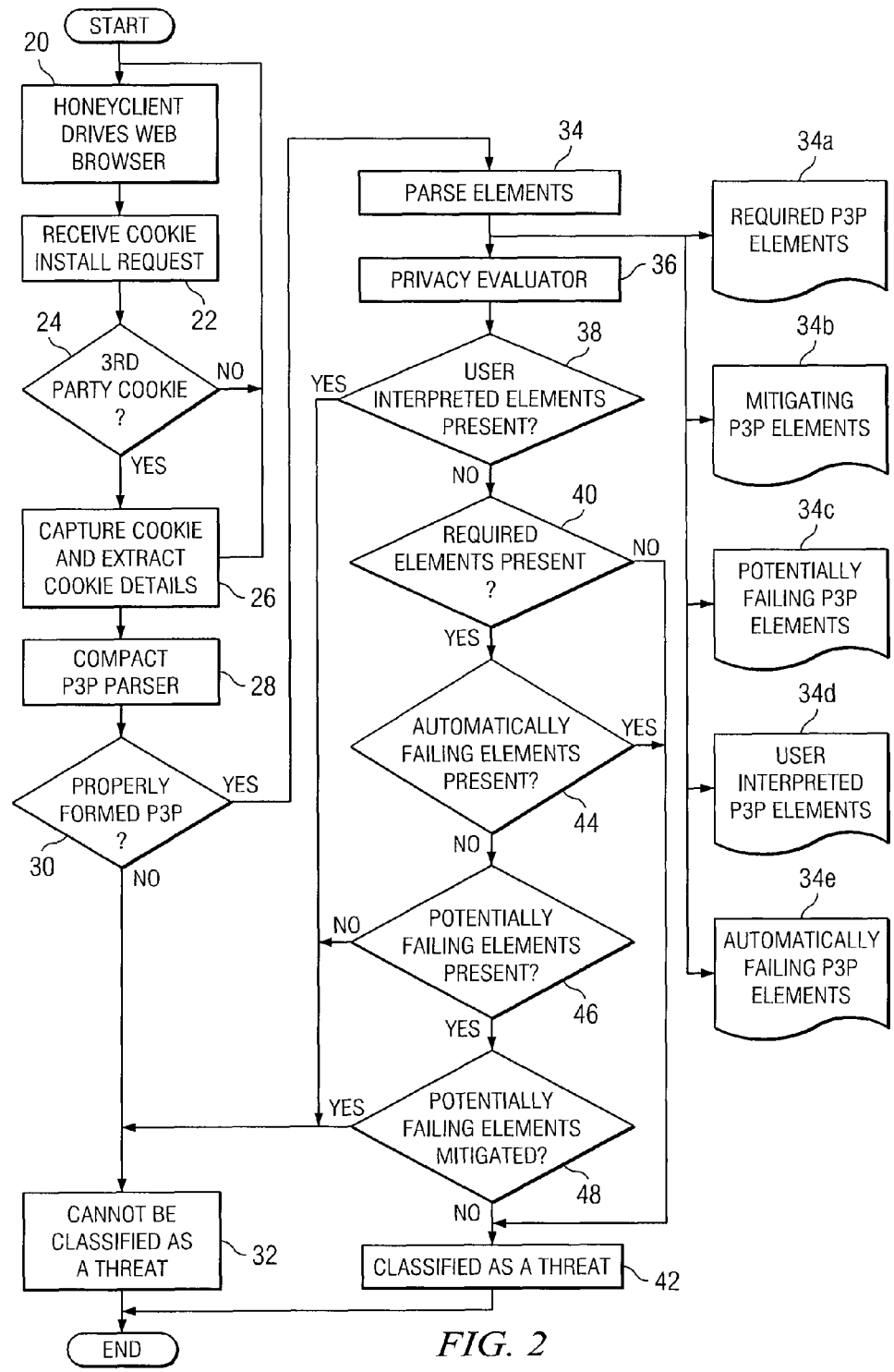
FIG. 2 is a flow-diagram of a method for identifying a cookie as a privacy threat in accordance with a particular embodiment of the present disclosure.

Particular embodiments of the disclosure and their advantages are best understood by reference to FIGS. 1 and 2.

FIG. 1 is a block diagram illustrating a system 2 that may be used to determine if a cookie is a privacy threat. The system includes an interface 4, memory 6, and one or more processors 8. These components may work together to allow a third-party cookie to be automatically evaluated to determine whether it may be a privacy threat. While system 2 is depicted a single device, in particular embodiments system 2 may be incorporated into other devices and/or its components may be spread out through a network. System 2 may be coupled to a network, for example the Internet.

Processor 8 may be a microprocessor, controller, or any other suitable computing device, resource, or combination of hardware, software and/or encoded logic operable to provide, either alone or in conjunction with other components of system 2 (e.g., memory 6) functionality to allow a cookie to be determined to be a privacy threat. Such functionality may include providing various features discussed herein to a user. For example, processor 8 may drive a web browser that visits a number of websites and watches for a third-party cookie install request. Processor 8 may also parse a privacy policy associated with a cookie, and evaluate it against a set of predefined criteria to determine if the cookie may be a threat to the privacy of a user.

Memory 6 may be any form of volatile or non-volatile memory including, without limitation, magnetic media, optical media, random access memory (RAM), read-only memory (ROM), removable media, or any other suitable local or remote memory component. Memory 6 may store a third-party cookie along with data and metadata associated therewith, including a privacy policy.

Interface 4 may comprise any hardware, software, or encoded logic needed to be able to send and receive information with other components, such as a memory 6. For example, interface 4 may receive a third-party cookie and associated data and communicate this data to memory 6.

An embodiment of the present disclosure may be combined with a crawler in order to enable many websites to be visited. Third-party cookies associated with those websites may be evaluated to determine if they should be considered a privacy threat. FIG. 2 illustrates a flow diagram of a method for determining whether a third-party cookie is a privacy threat. The method begins at step 20 where a HoneyClient drives a web browser which visits a website. A HoneyClient or client honeypot may be an active security program that poses as a client and interacts with a website's web server to receive a cookie and associated data to determine if there is a privacy threat. The website may be one of a number of pre-defined websites that the system may visit. At step 22 a cookie install request may be received. The cookie install request may be in the form of a prompt that requests the web browser to allow it to install a cookie.

A cookie may be a text file that can be stored by a web browser. A unique user ID may be included in the cookie to allow the entity that set the cookie to associate a variety of information with the unique user ID for tracking purposes. When the web browser with the stored cookie returns to the website that installed the cookie, the web server associated with that website may receive the cookie and use the information included in the text file. The information in the cookie may be used to customize a web page or for other operations that may be accomplished with information about the user or the user's browser. The web browser may return the cookie along with a request to access the web page that initially sent the cookie when the web browser is directed to return to the domain name associated with the web site that installed the cookie or any other link associated with that domain name.

At step 24 it is determined whether the cookie associated with the install prompt is a third-party cookie. A third-party cookie may be a cookie set by an entity that is not the entity to which the user directed his web browser. For example, a user may direct his web browser to request a web page from www.cnn.com. On the homepage of www.cnn.com may appear a link to a small image that is practically invisible. The link may also may be in the form of a banner ad on www.cnn.com. This image or banner ad may appear to be hosted on a server associated with www.cnn.com but may actually be hosted on an advertiser's server. For example, the small image may be hosted on www.advertising.com which may have an agreement with CNN to allow its image to appear on www.cnn.com. In fetching either the invisible image or the banner ad, the web browser may contact the server on www.advertising.com unknowingly to the user and a cookie may be set through the user's web browser by www.advertising.com.

Using third-party cookies, certain entities may be able to track websites visited by a particular web browser by contracting with the hosts of many different web sites. Each of the different hosts may allow a third-party, such as www.advertising.com, to place an invisible link on that website. By retrieving the cookie when the user visits the websites on which the advertiser has placed its link. The advertiser may track the browsing habits of the user. This tracking may be accomplished without the user's knowledge. To the user, it appears as if he has only contacted the host website, such as www.cnn.com, and the user has no knowledge that it has actually allowed information to be received by www.advertising.com. Third-party cookies may also allow an entity that sets the cookie to determine from which website the request is coming. This ability to track the websites visited by a user and associate this information with a unique user ID through a third-party cookie may present a privacy threat to the user, particularly because the user is unaware that he is being tracked.

If the cookie is not a third-party cookie, then the system continues to the next website on its list. If the cookie is a third-party cookie, then details associated with the third-party cookie may be extracted at step 26. Details associated with a third-party cookie may include the source URL, the name, the domain path, the expiration date, whether the cookie is secure, data associated with the third-party cookie, whether the cookie is a session cookie, and a privacy policy. The privacy policy may be a compact Platform for Privacy Preferences (P3P) policy. The details associated with the third-party cookie may be included in the text file that is the cookie itself, or may be included as data or metadata that is associated with the third-party cookie but is stored separately. Certain metadata may be received by the web browser and temporarily stored to allow evaluation. The details associated with the cookie may also be captured by the system and stored until the user determines that it should be deleted.

After the cookie and associated data and metadata are captured and the details are extracted at step 26, then the system continues to the next website on its list. The system also sends the data associated with the cookie to the compact P3P parser at step 28. A compact P3P policy may be consistent with standards set forth by the World Wide Web Consortium (W3C). Such standards may be included in The Platform for Privacy Preferences 1.0 (P3P1.0) Specification which may be found at http://www.w3.org/TR/2002/REC-P3P-20020416/ The policy may be in the form of a series of three-letter tags that are separated by spaces. The three-letter tags may be codes that provide general information that outlines an entity's privacy policy associated with cookies that it sets. For example, the compact P3P policy may include the three-letter tag "DEV". This tag may indicate that the policy of the entity that set the cookie is to use information received through the cookie in order to enhance, evaluate, or otherwise review its website, service, product, or market. Third-party cookies without compact P3P policies may automatically fail and may be classified as a threat.

A text file including such tags may be sent to the user's computer through his web browser. It may be sent as metadata associated with the cookie but may not be a part of the cookie. The compact P3P policy may be temporarily stored and may be captured by a system or program in accordance with an embodiment of the present disclosure. In addition to the three-letter code, the compact P3P policy may include an optional attribute signified by an "a" (always), "o" (opt-out), "i" (opt-in). These optional attributes may indicate that a user may opt-in or opt-out of the use of the user's information associated with the cookie, or the information will always be used. If the user opts-in, he may also withdraw his consent to use certain information. The optional attribute "a" and "o" may be disregarded by the system such that the tag is treated as if it were just the base tag with no optional attribute. The optional attribute "i" may be considered as part of the tag and be evaluated as described herein.

The system may determine whether the compact P3P policy is well formed at step 30. A well formed compact P3P policy may be one that includes tags that are recognized as those consistent with the three-letter codes (and optional attributes) set by the W3C. Therefore, a compact P3P policy that includes a seven-letter tag would be determined to be not well formed. If this determination is made, then the cookie associated with the improperly formed compact P3P policy cannot be classified as a threat as shown by step 32.

In accordance with certain embodiments of the present disclosure, certain codes included in the compact P3P policy may indicate that the data handling practices of the entity that set the third-party cookie may be a threat to a user's privacy. For example, certain compact P3P policies may indicate that the data obtained by the entity setting the cookie may be used to create a behavioral profile of the user. A compact P3P policy may also indicate that an entity may obtain personal identifiable information either through mining that information or collecting it outright.

At step 34, the elements of the compact P3P policy associated with the third-party cookie may be parsed. The elements may be parsed into required P3P elements 34a, mitigating P3P elements 34b, potentially failing P3P elements 34c, user interpreted P3P elements 34d, and automatically failing P3P elements 34f. Parsing the elements or tags of the compact P3P policy may involve capturing specific tags and transforming them into a form suitable for further processing.

At step 36, a privacy evaluator may evaluate the parsed compact P3P elements to determine whether the cookie associated with those elements should be considered a privacy threat. At step 38, the system may determine whether there are any user interpreted elements included in the compact P3P policy. A user interpreted element may indicate that a threat to privacy may not be determined without additional information that may be interpreted by a user. This additional information may be included in the full P3P policy, the human-readable privacy policy, or both.

For example, a compact P3P policy associated with a third-party cookie being evaluated by the privacy evaluator of the present disclosure may include the code "OTP". This code may indicate that the information received by the entity setting the third-party cookie may be used for other purposes. However, it is not clear from this code whether those other purposes may be a privacy threat to the user. Therefore, it may be helpful to evaluate the full P3P policy, the human-readable privacy policy, or both, to determine the other purposes for which the information may be used. If the user interpreted element or tag is present, then the cookie associated with this compact P3P policy may not be classified as a threat. If a user interpreted element is not present in the compact P3P policy, then the system continues to step 40.

At step 40, it is determined whether a required element is included in the compact P3P policy. For example, the system may determine whether the compact P3P policy includes the tag "NID". This tag may indicate that the website setting the cookie is not tracking personally identifiable information. If a required tag such as "NID" is not included in the compact P3P policy, then the cookie associated with the P3P policy may fail and be classified as a threat at step 42.

If the required elements are present in the compact P3P policy, then the system may proceed to step 44 where it is determined whether an automatically failing element is present in the compact P3P policy. If an automatically failing element or tag is present in the compact P3P policy, the cookie may fail and be classified as a threat immediately and have no opportunity to be mitigated. For example, if a compact P3P policy associated with a cookie includes the tag "CON", it may be immediately classified as a threat. The tag CON may indicate that information received through the third-party cookie may be used to contact the individual, through a communications channel other than voice telephone, for the promotion of a product or service. Such use of information received by a third-party website that the user may not be aware that he has provided information to, may be considered to be a privacy threat.

Other tags may indicate that information received by a third-party may be a privacy threat. For example, tags indicating that the entity setting the third-party cookie intends to receive and use financial information about the user or physical and mental health information about the user may also be considered an automatically failing element and cause the cookie associated with this policy to be classified as a threat at step 42.

Certain tags may be classified as potentially failing tags. At step 46, it may be determined whether the compact P3P policy includes tags that are potentially failing. Potentially failing tags may not cause the cookie associated with the compact P3P policy to be classified as a threat immediately, but rather may be mitigated by other tags that indicate that the use of certain information may not be as threatening to the privacy of the user. For example, a compact P3P policy may include the tag COM. This tag may indicate that information about the computer system that the individual is using to access the network is being collected by the entity setting the cookie. Such information may include the IP number, domain name, browser type, or operating system of the user. This type of information may be a threat to privacy if it is used in a certain way. However, if it is used in another way, for example for development purposes ("DEV"), then the privacy threat may be minimized.

If a potentially failing element is not present, then the cookie associated with the compact P3P policy may not be classified as a threat. However, if a potentially failing element is present then the method continues to step 48 where it may be determined whether the potentially failing element is mitigated. Cookies associated with compact P3P policies that include potentially failing elements may be considered a risk for which the potential threat may be mitigated. A threat may be what is left after mitigation. A potentially failing element may be mitigated by combining it with another element. It may also be mitigated by a determination that a combination of elements are not present that would indicate a privacy threat.

For example, the presence of a COM tag, which has been determined to be a potentially failing tag, may be mitigated by the presence of a DEV tag. The combination of the COM tag and the DEV tag may indicate that the information about a user's computer system may be used to enhance, evaluate, or otherwise review the site, service, product or market of the entity setting the cookie. As another example, the combination of certain tags may indicate that the cookie associated with the P3P policy is a privacy threat. For example, if the IND tag is present, this tag may indicate that the information obtained is retained for an indeterminate period of time. If this tag is present, and an ALL tag is not present but one of the tags in the following set [IVAi, IVDi, CONi, TELi, PHYi, ONLi, UNIi, PURi, FINi, INTi, DEMi, CNTi, POLi, HEAi, PREi, LOCi, GOVi, UNRi, OTC] is present, then the cookie associated with the P3P policy has not been mitigated and may be classified as a threat at step 42.

Cookies that are classified as a threat may be included in a signature file. This signature file may be included with anti-spyware software. When a user uses this anti-spyware software, if the software receives a request to install a cookie whose domain name is included in the signature file, the user may be warned that this cookie has been determined to be a privacy threat. Then, the user may take appropriate action, which may include ignoring the warning and continuing to receive the install cookie, or denying the request to set the cookie. The anti-spyware software may also be used to detect cookies that are already installed on the user's web browser when the anti-spyware software scans the user's computer system.

Some of the steps illustrated in FIG. 2 may be combined, modified, or deleted where appropriate, and additional steps may also be added to the flowcharts. Additionally, steps may be performed in any suitable order without departing from the scope of the invention.

As has been described above, a system in accordance with a particular embodiment of the present disclosure automatically collects cookies. Logic is applied to a privacy policy associated with these cookies and a result of whether the cookie presents a privacy threat is returned.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims.

P3P Tag Classification

The following is an example of the classification of W3C tags that may be used by the system to determine whether a cookie is a privacy threat.

Required Tags:

The NID tag must be in the policy. If it is not, then the cookie is automatically classified as a threat with no chance for mitigation.

Automatically Failing Tags—No mitigation:

The presence of these tags may cause a cookie to be classified as a threat immediately, with no chance of mitigation based on other tags.

CNT
CON
DEM
FIN
GOV
HEA
INT
IVA
IVD
LOC
ONL
POL
PHY
PRE
PSA
PSD
PUB
PUR
TEL
TST
UNI
UNR

Potentially Failing Tags—Mitigation Possible:

These tags may cause a cookie to be classified as a threat unless other mitigating tags are present.

COM—Mitigation provided by a DEV tag.
CONi—Mitigation provided by an ALL tag.
IVAi—Mitigation provided by an ALL tag.
IVDi—Mitigation provided by an ALL tag.
NAV—Mitigation provided by a DEV tag.
TELi—Mitigation provided by an ALL tag.

Passing Tags Which Fail in Combination With Others:

These tags may not by themselves cause a threat classification, but when combined with others may cause a cookie to be so classified.

IND—If ALL is not present, but one of the set [IVAi, IVDi, CONi, TELi, PHYi, ONLi, UNIi, PURi, FINi, INTi, DEMi, CNTi, POLi, HEAi, PREi, LOCi, GOVi, UNRi, OTC] is present, then the cookie is classified as a threat.

Mitigating Tags:

These tags may mitigate an otherwise potentially failing cookie.

ALL—Mitigates certain opt-in tags that would otherwise fail.

DSP—This combined with one of COR, MON, or LAW and the existence of an acceptable policy located at the URI indicated by the long-description element of the dispute section of the full P3P policy may mitigate a OUR or SAM tag which may fail due to an unacceptable human-readable privacy policy.

COR—This is a secondary requirement, allowing DSP to be able to be taken into account mitigating failing privacy policies.

MON—This is a secondary requirement, allowing DSP to be able to be taken into account mitigating failing privacy policies.

LAW—This is a secondary requirement, allowing DSP to be able to be taken into account mitigating failing privacy policies.

Passing Tags That Should Not Be Mistaken For Failing ones:

DEV
PSAi
PSDi
PUBi

User Interpreted Tags:

These tags may require a human to interpret portions of either the full P3P policy, the human-readable privacy policy, or both. A cookie associated with these tags may not be automatically classified as a threat.

BUS—If a retention policy is not clearly referenced or defined in the site's human-readable policy this tag may be considered a threat.

OTC—The Other Categories defined in the full P3P policy may be interpreted

OTP—The Other Purposes defined in the full P3P policy may be interpreted

OTR—The Other Recipients defined in the full P3P policy may be interpreted

OUR—The human-readable privacy policy may be interpreted

SAM—The human-readable privacy policy may be interpreted

Failure For Insufficient Information:

Since many tags may be required only when NID is not present, and are otherwise optional, it may be possible for a well-formed compact P3P policy to contain far too few tags to allow a threat determination to be made. In the case of a compact P3P policy not containing at least one CATEGORY tag and one PURPOSE tag (as defined in section 4 of The Platform for Privacy Preferences 1.0 (P3P1.0) Specification), the associated cookie is to be failed based on insufficient information.

Tag Reference

Below are tag definitions from The Platform for Privacy Preferences 1.0 (P3P1.0) Specification which may be available at http://www.w3.org/TR/2002/REC-P3P-20020416/. Tags may be modified by adding an i, which indicates that the tag so modified is opt-in only. The following list may not include all tags established by the W3C.

ALL: All Identified Data: access is given to all identified data.

BUS: Determined by service provider's business practice: Information is retained under a service provider's stated business practices. Sites MUST have a retention policy that establishes a destruction time table. The retention policy MUST be included in or linked from the site's human-readable privacy policy.

CNT: The words and expressions contained in the body of a communication—such as the text of email, bulletin board postings, or chat room communications.

COM: Information about the computer system that the individual is using to access the network—such as the IP number, domain name, browser type or operating system.

CON: Information may be used to contact the individual, through a communications channel other than voice telephone, for the promotion of a product or service. This includes notifying visitors about updates to the Web site. This does not include a direct reply to a question or comment or customer service for a single transaction—in those cases, <current/> would be used. In addition, this does not include marketing via customized Web content or banner advertisements embedded in sites the user is visiting—these cases would be covered by the <tailoring/>, <pseudo-analysis/> and <pseudo-decision/>, or <individual-analysis/> and <individual-decision/> purposes.)

COR: Errors or wrongful actions arising in connection with the privacy policy will be remedied by the service.

DEM: Data about an individual's characteristics—such as gender, age, and income.

DEV: Information may be used to enhance, evaluate, or otherwise review the site, service, product, or market. This does not include personal information used to tailor or modify the content to the specific individual nor information used to evaluate, target, profile or contact the individual.

FIN: Information about an individual's finances including account status and activity information such as account balance, payment or overdraft history, and information about an individual's purchase or use of financial instruments including credit or debit card information. Information about a discrete purchase by an individual, as described in "Purchase Information," alone does not come under the definition of "Financial Information."

GOV: Identifiers issued by a government for purposes of consistently identifying the individual.

HEA: information about an individual's physical or mental health, sexual orientation, use or inquiry into health care services or products, and purchase of health care services or products.

INT: Data actively generated from or reflecting explicit interactions with a service provider through its site—such as queries to a search engine, or logs of account activity.

IND: Information is retained for an indeterminate period of time. The absence of a retention policy would be reflected under this option. Where the recipient is a public foray, this is the appropriate retention policy.

IVA: Information may be used to determine the habits, interests, or other characteristics of individuals and combine it with identified data for the purpose of research, analysis and reporting. For example, an online Web site for a physical store may wish to analyze how online shoppers make offline purchases.

IVD: Information may be used to determine the habits, interests, or other characteristics of individuals and combine it with identified data to make a decision that directly affects that individual. For example, an online store suggests items a visitor may wish to purchase based on items he has purchased during previous visits to the Web site.

LAW: Remedies for breaches of the policy statement will be determined based on the law referenced in the human readable description.

LOC: Information that can be used to identify an individual's current physical location and track them as their location changes—such as GPS position data.

MON: If the service provider violates its privacy policy it will pay the individual an amount specified in the human readable privacy policy or the amount of damages.

NAV: Data passively generated by browsing the Web site—such as which pages are visited, and how long users stay on each page.

ONL: Information that allows an individual to be contacted or located on the Internet—such as email. Often, this information is independent of the specific computer used to access the network.

OTC: Other Category

OTP: Other Purpose

OTR: Other Recipient

OUR: [Recipients include] Ourselves and/or entities acting as our agents or entities for whom we are acting as an agent: An agent in this instance is defined as a third-party that processes data only on behalf of the service provider for the completion of the stated purposes. (e.g., the service provider and its printing bureau which prints address labels and does nothing further with the information.

POL: Membership in or affiliation with groups such as religious organizations, trade unions, professional associations, political parties, etc.

PHY: Information that allows an individual to be contacted or located in the physical world—such as telephone number or address.

PRE: Data about an individual's likes and dislikes—such as favorite color or musical tastes.

PSA: Information may be used to create or build a record of a particular individual or computer that is tied to a pseudonymous identifier, without tying identified data (such as name, address, phone number, or email address) to the record. This profile will be used to determine the habits, interests, or other characteristics of individuals for purpose of research, analysis and reporting, but it will not be used to attempt to identify specific individuals. For example, a marketer may wish to understand the interests of visitors to different portions of a Web site.

PSD: Information may be used to create or build a record of a particular individual or computer that is tied to a pseudonymous identifier, without tying identified data (such as name, address, phone number, or email address) to the record. This profile will be used to determine the habits, interests, or other characteristics of individuals to make a decision that directly affects that individual, but it will not be used to attempt to identify specific individuals. For example, a marketer may tailor or modify content displayed to the browser based on pages viewed during previous visits.

PUB: [Recipients include] Public foray such as bulletin boards, public directories, or commercial CD-ROM directories PUR: Information actively generated by the purchase of a product or service, including information about the method of payment.

SAM: [Recipients include] Legal entities following our practices: Legal entities who use the data on their own behalf under equable practices. (e.g., consider a service provider that grants the user access to collected personal information, and also provides it to a partner who uses it once but discards it. Since the recipient, who has otherwise similar practices, cannot grant the user access to information that it discarded, they are considered to have equable practices.

TEL: Information may be used to contact the individual via a voice telephone call for promotion of a product or service. This does not include a direct reply to a question or comment or customer service for a single transaction TST: The TEST element is used for testing purposes: the presence of TEST in a policy indicates that the policy is just an example, and as such, it MUST be ignored, and not be considered as a valid P3P policy.

UNI: Non-financial identifiers, excluding government-issued identifiers, issued for purposes of consistently identifying or recognizing the individual. These include identifiers issued by a Web site or service.

UNR: [Recipients include] Legal entities whose data usage practices are not known by the original service provider.

What is claimed is:

1. A method for automatically identifying a cookie as a privacy threat, comprising:
  receiving a request to install a cookie;
  receiving a privacy policy associated with the cookie;
  evaluating, using a processor, one or more tags of the privacy policy against a set of predefined criteria, wherein evaluating the one or more tags comprises classifying the one or more tags of the privacy policy into a plurality of types selected from the group consisting of required tags, mitigating tags, potentially failing tags, user interpreted tags, and automatically failing tags; and
  determining that the cookie is a privacy threat based on the evaluation of the privacy policy.

2. The method of claim 1, wherein the privacy policy comprises a compact Platform for Privacy Preferences ("P3P") policy associated with the cookie.

3. The method of claim 2, further comprising determining whether the compact Platform for Privacy Preferences ("P3P") policy is well formed.

4. The method of claim 1, wherein receiving the request comprises receiving the request from a third-party, and the cookie comprises a third-party cookie.

5. The method of claim 1, further comprising contacting a set of predefined websites.

6. The method of claim 1, wherein determining that the cookie is a privacy threat further comprises determining that a required tag is not included in the privacy policy.

7. The method of claim 1, wherein determining that the cookie is a privacy threat further comprises determining that an automatically failing tag is included in the privacy policy.

8. The method of claim 1, wherein determining that the cookie is a privacy threat further comprises determining that a potentially failing tag is present in the privacy policy and determining that a mitigating tag is not included in the privacy policy.

9. The method of claim 1, further comprising collecting in a signature file a plurality of domain names associated with a corresponding plurality of cookies, each cookie of the plurality of cookies determined to be a privacy threat.

10. The method of claim 1, wherein evaluating the privacy policy further comprises parsing the privacy policy into a first element and a second element.

11. The method of claim 10, wherein evaluating the privacy policy further comprises classifying the first element as an automatically failing element; and
  wherein determining that the cookie is a privacy threat is further based on the classification of the first element.

12. The method of claim 10, wherein evaluating the privacy policy further comprises classifying the first element as a potentially failing element, and determining that a mitigating element is not included in the privacy policy; and
  wherein determining that the cookie is a privacy threat is further based on the classification of the first element and the determination that the mitigating element is not included in the privacy policy.

13. Logic encoded in tangible, non-transitory computer-readable storage media and when executed on a processor operable to perform operations comprising:
  receiving a request to install a cookie;
  receiving a privacy policy associated with the cookie;
  evaluating one or more tags of the privacy policy against a set of predefined criteria, wherein evaluating the one or more tags comprises classifying the one or more tags of the privacy policy into a plurality of types selected from the group consisting of required tags, mitigating tags, potentially failing tags, user interpreted tags, and automatically failing tags; and
  determining that the cookie is a privacy threat based on the evaluation of the privacy policy.

14. The logic encoded in tangible, non-transitory computer-readable storage media of claim 13, wherein the privacy policy comprises a compact Platform for Privacy Preferences ("P3P") policy associated with the cookie.

15. The logic encoded in tangible, non-transitory computer-readable storage media of claim 14, further operable to determine whether the compact Platform for Privacy Preferences ("P3P") policy is well formed.

16. The logic encoded in tangible, non-transitory computer-readable storage media of claim 13, wherein receiving the request comprises receiving the request from a third-party, and the cookie comprises a third-party cookie.

17. The logic encoded in tangible, non-transitory computer-readable storage media of claim 13, further operable to contact a set of predefined websites.

18. The logic encoded in tangible, non-transitory computer-readable storage media of claim 13, wherein determining that the cookie is a privacy threat further comprises determining that a required tag is not included in the privacy policy.

19. The logic encoded in tangible, non-transitory computer-readable storage media of claim 13, wherein determining that the cookie is a privacy threat further comprises determining that an automatically failing tag is included in the privacy policy.

20. The logic encoded in tangible, non-transitory computer-readable storage media of claim 13, wherein determining that the cookie is a privacy threat further comprises determining that a potentially failing tag is present in the privacy policy and determining that a mitigating tag is not included in the privacy policy.

21. The logic encoded in tangible, non-transitory computer-readable storage media of claim 13, further comprising collecting in a signature file a plurality of domain names associated with a corresponding plurality of cookies, each cookie of the plurality of cookies determined to be a privacy threat.

22. The logic encoded in tangible, non-transitory computer-readable storage media of claim 13, wherein evaluating the privacy policy further comprises parsing the privacy policy into a first element and a second element.

23. The logic encoded in tangible, non-transitory computer-readable storage media of claim 22, wherein evaluating the privacy policy further comprises classifying the first element as an automatically failing element; and
  wherein determining that the cookie is a privacy threat is further based on the classification of the first element.

24. The logic encoded in tangible, non-transitory computer-readable storage media of claim 22, wherein evaluating the privacy policy further comprises classifying the first element as a potentially failing element, and determining that a mitigating element is not included in the privacy policy; and
  wherein determining that the cookie is a privacy threat is further based on the classification of the first element and the determination that the mitigating element is not included in the privacy policy.

25. A system, comprising:
  an interface operable to perform operations comprising:
    receiving a request to install a cookie;

receiving a privacy policy associated with the cookie; and a processor coupled to the interface being operable to perform operations comprising:

evaluating one or more tags of the privacy policy against a set of predefined criteria, wherein evaluating the one or more tags comprises classifying the one or more tags of the privacy policy into a plurality of types selected from the group consisting of required tags, mitigating tags, potentially failing tags, user interpreted tags, and automatically failing tags; and determining that the cookie is a privacy threat based on the evaluation of the privacy policy.

26. The system of claim 25, wherein the privacy policy comprises compact Platform for Privacy Preferences ("P3P") policy associated with the cookie.

27. The system of claim 26, wherein the processor is further operable to determine whether the compact Platform for Privacy Preferences ("P3P") policy is well formed.

28. The system of claim 25, wherein receiving the request comprises receiving the request from a third-party, and the cookie comprises a third-party cookie.

29. The system of claim 25, wherein the processor is further operable to contact a set of predefined websites.

30. The system of claim 25, wherein determining that the cookie is a privacy threat further comprises determining that a required tag is not included in the privacy policy.

31. The system of claim 25, wherein determining that the cookie is a privacy threat further comprises determining that an automatically failing tag is included in the privacy policy.

32. The system of claim 25, wherein determining that the cookie is a privacy threat further comprises determining that a potentially failing tag is present in the privacy policy and determining that a mitigating tag is not included in the privacy policy.

33. The system of claim 25, further comprising collecting in a signature file a plurality of domain names associated with a corresponding plurality of cookies, each cookie of the plurality of cookies determined to be a privacy threat.

34. The system of claim 25, wherein evaluating the privacy policy further comprises parsing the privacy policy into a first element and a second element.

35. The system of claim 34, wherein evaluating the privacy policy further comprises classifying the first element as an automatically failing element; and wherein determining that the cookie is a privacy threat is further based on the classification of the first element.

36. The system of claim 34, wherein evaluating the privacy policy further comprises classifying the first element as a potentially failing element, and determining that a mitigating element is not included in the privacy policy; and wherein determining that the cookie is a privacy threat is further based on the classification of the first element and the determination that the mitigating element is not included in the privacy policy.

* * * * *